(12) United States Patent
Berthou et al.

(10) Patent No.: US 11,187,259 B2
(45) Date of Patent: Nov. 30, 2021

(54) LUBRICATING CAP, FASTENER COMPRISING THIS TYPE OF CAP AND INTERFERENCE ASSEMBLY PROCESS

(71) Applicant: LISI AEROSPACE, Paris (FR)

(72) Inventors: Alexandre Berthou, Bois-Colombes (FR); Martial Broucke, Delincourt (FR)

(73) Assignee: LISI AEROSPACE, Paris (FR)

( * ) Notice: Subject to any disclaimer, the term of this patent is extended or adjusted under 35 U.S.C. 154(b) by 131 days.

(21) Appl. No.: 16/324,854

(22) PCT Filed: Aug. 11, 2017

(86) PCT No.: PCT/EP2017/070511
§ 371 (c)(1),
(2) Date: Feb. 11, 2019

(87) PCT Pub. No.: WO2018/029366
PCT Pub. Date: Feb. 15, 2018

(65) Prior Publication Data
US 2019/0170177 A1 Jun. 6, 2019

(30) Foreign Application Priority Data
Aug. 12, 2016 (FR) ...................................... 1657751

(51) Int. Cl.
*F16B 25/02* (2006.01)
*F16B 19/05* (2006.01)
(Continued)

(52) U.S. Cl.
CPC ............... *F16B 19/05* (2013.01); *F16B 33/06* (2013.01); *F16N 1/00* (2013.01)

(58) Field of Classification Search
CPC ........... F16B 19/05; F16B 19/06; F16B 19/02
(Continued)

(56) References Cited

U.S. PATENT DOCUMENTS 3,639,137 A 2/1972 Marinelli
3,839,774 A 10/1974 Jackson
(Continued)

FOREIGN PATENT DOCUMENTS

CN 204357887 U 5/2015
CN 204533118 U 8/2015
(Continued)

OTHER PUBLICATIONS

Poll, Andreas, International Search Report, dated Nov. 14, 2017, 3 pages, WIPO, European Patent Office.

*Primary Examiner* — Gary W Estremsky
(74) *Attorney, Agent, or Firm* — Henricks Slavin LLP

(57) ABSTRACT

The object of the invention is a cap to lubricate an inner wall of a perforation going through at least two elements of the structure. The cap comprises a tubular body and at least one lubricant reserve, and before installation in the structure said cap has a largest external diameter larger than an internal diameter ($D_S$) of the perforation, and the cap lubricates the internal surface of the perforation when its largest external diameter is radially compressed by a wall of the perforation. The invention also concerns a fastener comprising this type of cap, and an interference assembly process for the fastener equipped with the cap. The invention is applicable to the assembly of aircraft structures.

14 Claims, 3 Drawing Sheets

Figure 8:
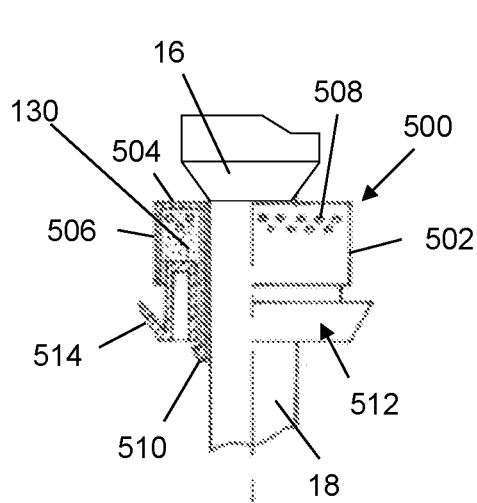

(51) Int. Cl.
*F16B 33/06* (2006.01)
*F16N 1/00* (2006.01)

(58) Field of Classification Search
USPC .................................................. 411/386
See application file for complete search history.

(56) References Cited

U.S. PATENT DOCUMENTS

| | | | |
|---|---|---|---|
| 3,979,351 A | 9/1976 | Sekhon | |
| RE30,445 E | 12/1980 | Ruhl | |
| 4,326,825 A | 4/1982 | Volkmann et al. | |
| 5,098,238 A | 3/1992 | Batchelor et al. | |
| 5,260,100 A * | 11/1993 | Day | B05D 3/0426 |
| | | | 427/386 |
| 5,908,277 A * | 6/1999 | Richards | F16B 19/05 |
| | | | 411/258 |
| 6,196,270 B1 * | 3/2001 | Richards | B65D 59/02 |
| | | | 138/96 R |
| 6,665,922 B2 | 12/2003 | Schultz | |
| 6,685,410 B1 * | 2/2004 | Allen | F16B 19/05 |
| | | | 411/361 |
| 6,702,684 B2 | 3/2004 | Harbin et al. | |
| 7,275,903 B2 * | 10/2007 | Schultz | F16B 23/0069 |
| | | | 411/378 |
| 7,465,137 B2 * | 12/2008 | Dietz | F16B 35/044 |
| | | | 411/386 |
| 7,571,936 B2 * | 8/2009 | Schneider | F16B 7/182 |
| | | | 138/96 R |
| 7,950,885 B2 * | 5/2011 | Rosenkranz | F16B 33/004 |
| | | | 411/82.2 |
| 7,950,887 B2 * | 5/2011 | Dietz | F16B 35/044 |
| | | | 411/386 |
| 8,287,219 B2 * | 10/2012 | Opper | H01R 13/506 |
| | | | 411/431 |
| 8,814,486 B1 * | 8/2014 | Pryor | F16B 33/006 |
| | | | 411/393 |
| 10,072,695 B2 * | 9/2018 | Maurel | F16B 33/06 |
| 10,544,815 B2 * | 1/2020 | Bourges | C10M 107/06 |
| 2013/0140044 A1 | 6/2013 | Carrerot | |

FOREIGN PATENT DOCUMENTS

| | | |
|---|---|---|
| EP | 0350678 | 1/1990 |
| SU | 712153 | 1/1980 |

* cited by examiner

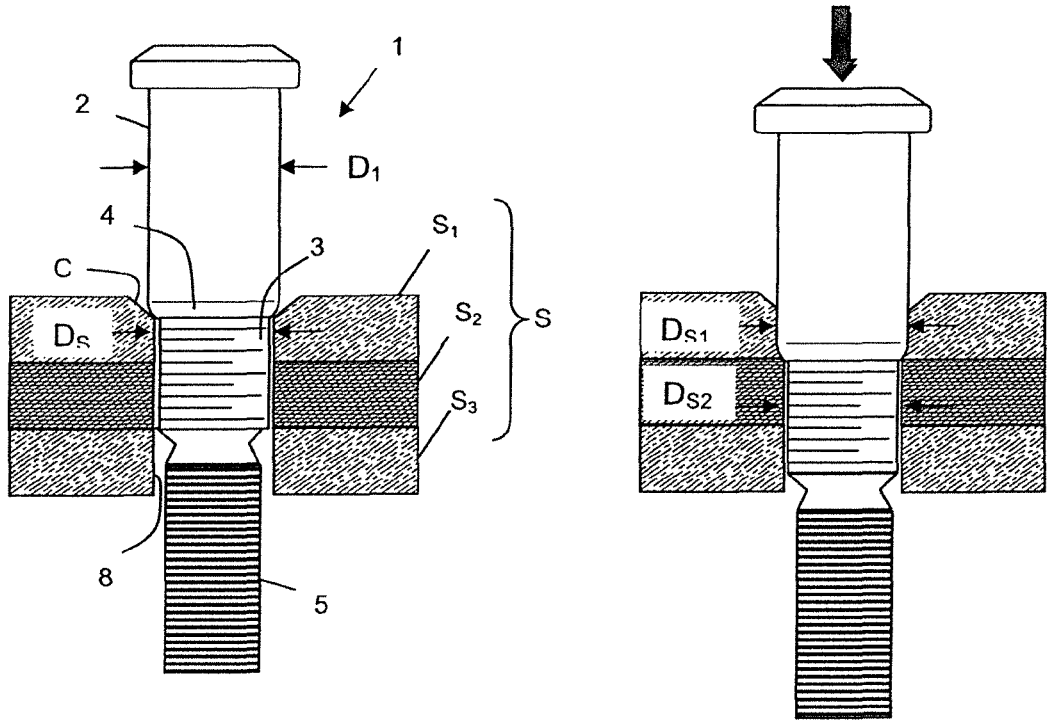
FIG. 1
PRIOR ART
FIG. 2
PRIOR ART
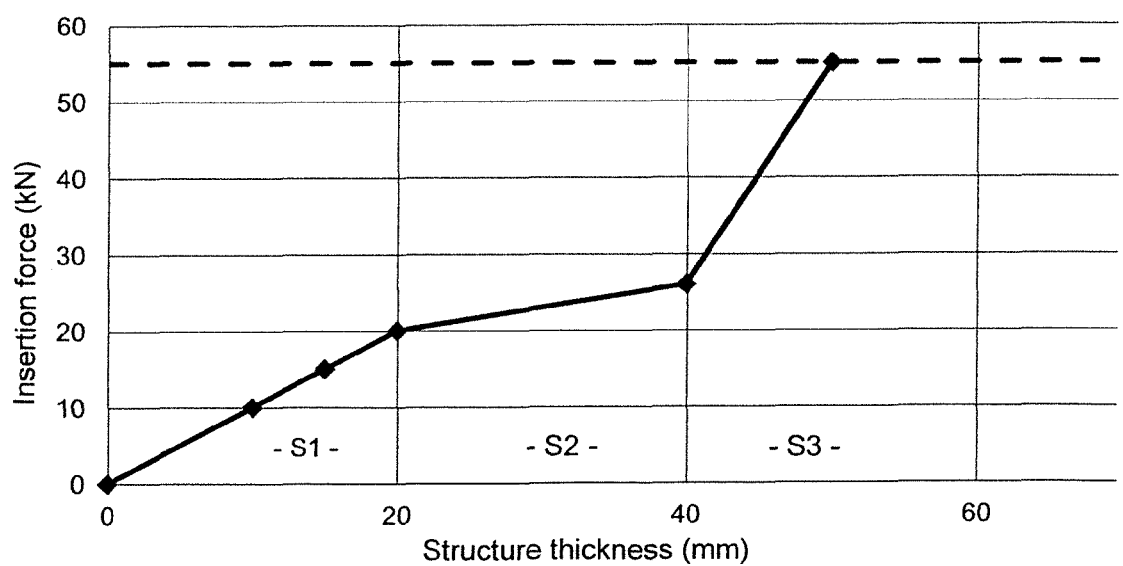

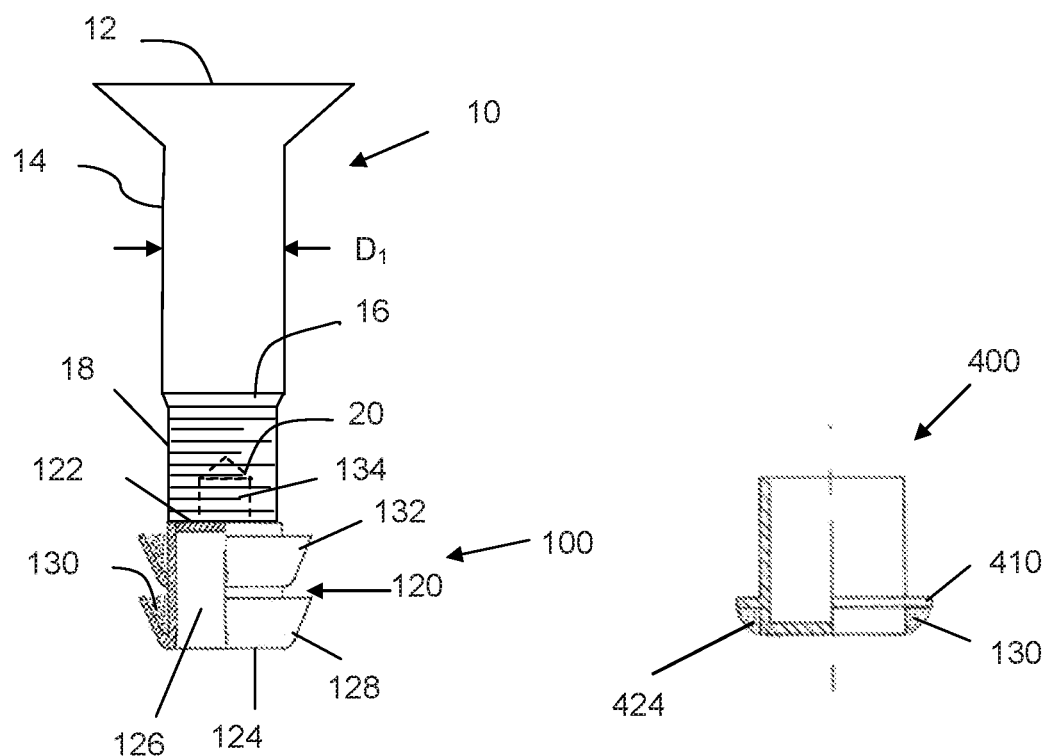
FIG. 4
FIG. 7
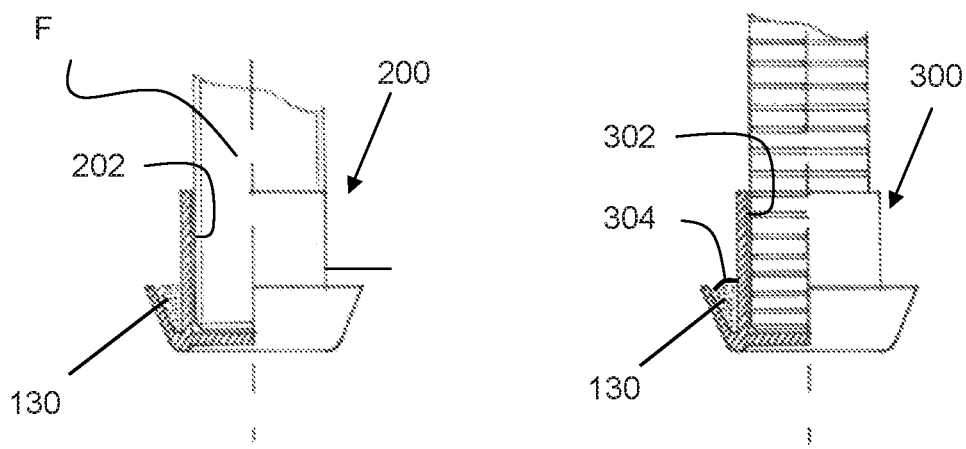
FIG. 5
FIG. 6

LUBRICATING CAP, FASTENER COMPRISING THIS TYPE OF CAP AND INTERFERENCE ASSEMBLY PROCESS

CROSS REFERENCE TO RELATED APPLICATIONS

This application is a National Stage of International Application No. PCT/EP2017/070511, filed Aug. 14, 2017, which claims priority to FR 1657751 filed Aug. 12, 2016, the entire contents of which are incorporated herein by reference.

The present invention relates to a fastener to be installed in interference in the perforation of an aircraft structure, and to a method for installing such a fastener in an assembly of structures.

Certain aircraft structures undergo strong shearing forces and widely varying load cycles, typically the structures of wings or wings/fuselage connectors. To assemble these structures, fasteners installed in interference are used, meaning there is a negative clearance between the shaft of the fastener and the perforation in the structure receiving the fastener. In other words, the external diameter of the fastener is larger than the perforation diameter before installation of the fastener. This method of installing fasteners in interference helps improve the resistance of the structure, in particular its resistance to cyclical loads.

The interference fasteners currently used are the push or pull type. A third type of fastener known as sheathed or "sleeved" helps create an interference structure without any friction on it during the installation phase.

The pull fasteners feature an enlarged head, designed to rest on one side of the structure, known as the "front" side, or in a recess made in this side, a shaft, a locking portion in the form of a thread or crimping grooves, and a pulling stem comprising traction grooves. The fastener is sized such that the pulling stem protrudes from the opposite side of the structure—known as the "rear" side. These grooves are by gripped a tool that pulls on the pulling stem, and inserts the fastener until the head comes alongside the front side of the structure. The stem is then broken or removed. These fasteners are typically GP™, LGP™ or XPL™ lockbolts from HUCK Manufacturing, or PULL-IN™ or PULL-STEM™ fasteners from LISI AEROSPACE. These fasteners are for example described in the U.S. RE30445, U.S. Pat. Nos. 6,702,684, 5,098,238 or 6,665,922.

The push fasteners feature the same elements as the pull fasteners except for the pulling stem. They are installed in interference in the structure by pushing them using a hammer, a multi-heading gun or a jack if it is possible to position the structure in an assembly frame. These fasteners are typically HI-LITE™ fasteners described in the U.S. Pat. No. 4,326,825.

Sheathed fasteners are equipped with a sheath or sleeve that accommodates the shaft of the fastener, and can be installed by pushing, pulling or screwing. In this case the fastener is held steady in rotation and a nut is screwed onto the threaded end. Screwing the nut brings the body of the screw, which is slightly conical, inside the sleeve, which is held axially on the structure by its head, so that the sleeve expands radially inside the structure. This type of fastener is described for example in the patent application WO 2010/142901.

To protect the parts in contact from galvanic corrosion, and to prevent gripping between the thread of the screw and the tapping of a nut or between the shaft and the structure during interference installations, the fasteners can also be covered with an organic aluminum-pigmented coating, typically from five to thirteen microns thick, such as HI-KOTE™, developed and sold by the company HI-SHEAR Corporation, and described for example in the U.S. Pat. No. 3,979,351 and EP 2 406 336 B1. These coatings have a certain lubricating property, limiting the installation forces of the fastener when inserted into the structure or in the sheath for a sheathed fastener.

Aeronautical fasteners are generally lubricated with cetyl alcohol placed on the entire exterior surface of the fastener. Cetyl alcohol is a fatty alcohol from the semi-developed formula $CH_3(CH_2)_{15}$-OH. At ambient temperature, cetyl alcohol takes the form of a white waxy solid or flakes. In order to be applied on the fastener, the flakes are diluted in a solvent and the fastener is soaked in the solution. Once the solvent has evaporated, the solid flakes of cetyl alcohol cover the fastener.

FIG. 1 shows a fastener to be inserted from the prior art, being installed in interference in a structure S shown in section, comprising a perforation 8 with diameter $D_S$. Fastener 1 comprises a protruding head, a smooth cylindrical shaft 2 with exterior diameter $D_1$ larger than $D_S$, and a threaded end 3 with maximum diameter smaller than diameter $D_1$ of the smooth cylindrical shaft. A transition zone 4 connects the shaft 2 to the threaded end 3. The transition zone may have a variety of geometries, and one or more radii or an angle. Here the fastener comprises a pulling stem 5 equipped with traction grooves. The attachment is fully coated with an anti-corrosion organic coating such as HI-KOTE™ 1

On FIG. 2, the fastener in FIG. 1 is partially engaged in the structure by creating the interference.

As shown on FIGS. 1 and 2, whose dimensions are exaggerated for greater clarity, a chamfer or a radius is generally practiced on the entrance of the perforation on the first layer S1 of the structure in order to accommodate the below-head radius of the fastener. This chamfer does not exist on the other layers S2 and S3 in the middle of the assembly when the perforation is made on all layers. When going from one structure layer to the next, a geometric step effect is created since the perforation on the first layer is expanded radially by the shaft of the fastener already inserted, whereas the diameter of the perforation on the next layer is smaller.

The applicant discovered that the step effect accentuates the placement force when fastener 1 enters a layer with a material that's more rigid than the material of the layer previously crossed, for example when the fastener goes from a layer made from composite material to a metal layer, for example titanium, aluminum or steel, or when the fastener crosses an aluminum layer first, then a steel layer.

The step effect is accentuated slightly when the fastener enters a layer made from a material that's less rigid than the material of the layer previously crossed, for example when the fastener goes from a metal layer to a composite material layer.

The step effect is shown in FIG. 3, which shows a diagram of the insertion force of a fastener 1 of the prior art inserted in interference in structure S of FIGS. 1 and 2 if the total thickness of the structure is 60 mm, comprising three layers S1, S2 and S3, respectively made from aluminum, carbon and titanium fiber composites, each layer 20 mm thick. In this example the fastener can withstand a maximum insertion force of 56 kN, represented here by the dotted horizontal line. This means that if a force of more than 56 kN is placed on the fastener, the fastener's pulling stem breaks. When fastener 1 enters the first layer S1, the installation force increases significantly in a linear fashion with a first gradient. When entering the second layer S2, the gradient of the installation force decreases slightly, since the composite material of layer S2 deforms more easily under the necessary force than when inserting the fastener in interference in the aluminum.

When the fastener enters the third payer S3, the gradient is accentuated suddenly since layer S3 is made from titanium. Here the insertion force reaches the maximum threshold before shaft 2 of the fastener is completely inserted into the entire structure S. The fastener has not attached, meaning that the fastener head is not in contact with the front side of structure S and part of shaft 2 is outside structure S. To achieve securing, the fastener must be subjected to an installation force greater than the maximum resistance of the fastener and the fastener would break inside the structure before being properly installed.

The applicant observed that insertion in the first two layers considerably tore off the very thin lubricating layer or anti-corrosion coating on the transition zone 4 as well as on shaft 2. In fact transition zone 4 is the first zone of the fastener making contact with structure S. This zone is the one that rubs the most on the structure, since at installation it runs the entire thickness of the structure. Furthermore, transition zone 6 will undergo the geometric step effects when going through the layers which tend to localize contact forces and cause rapid deterioration of any coatings, and even of the geometry.

When the fastener enters the third layer S3, the rigidity of the titanium combined with the direct contact of the fastener and the structure leads to a sharp increase in the forces required to insert the fastener in interference in the third layer.

The applicant also observed that the perforations made in the various materials had different diameters, due to different ways of cutting the materials when perforating with the same tool. The difference in diameter may therefore accentuate the geometric step effect phenomenon. The step effect may also be created when the layers are pre-perforated then aligned, and the perforations of the various layers display a coaxiality defect.

Furthermore, the thicker the assembly, the more the friction surface between the smooth shaft of the fastener and the perforation increases. In high interference, the probability of not securing the fastener thus increases in thick assemblies due to the higher probability of the anti-corrosion coating and/or lubricant being pulled off.

An object of the invention is to overcome these problems.

The object of the invention is therefore a cap to lubricate an inner wall of a perforation or a sleeve with inner diameter ($D_S$) going through at least two structural elements.

The cap has a tubular body and at least one lubricant reserve, and before insertion in the perforation or sleeve has a largest exterior diameter larger than the smallest interior diameter ($D_S$) of said perforation or sleeve, and the lubricant of the cap is distributed on the interior surface of the perforation or of the sleeve when said cap is inserted into the perforation or the sleeve and is radially compressed by a wall of the perforation or sleeve.

Therefore the cap is the first to come into contact with the wall of the perforation when inserting the fastener in interference in the structure—or in the sleeve if the fastener is installed in interference in a sleeve—and with each layer of the structure.

"Lubricant" refers to any material or matter that is placed between two surfaces and reduces friction or wear between these two surfaces.

The cap according to the invention can further comprise one or more of the following features, taken individually or in combination:
    the tubular body of the cap has at least one wall facing an exterior surface of the tubular body, such that a cavity between said wall and said tubular body forms a reservoir for the lubricant
    an exterior surface of the wall of the one skirt present has the largest exterior diameter of the cap, before insertion into the perforation or the sleeve
    the tubular body, within a radial plane of the cap, presents a U-shaped section; this U-shaped section determines a cavity that forms a reservoir for the lubricant; the cap also features an annular piston element able to slide into said cavity of the tubular body, and the piston element has at least one skirt with the largest exterior diameter of the cap before insertion
    in this case, the piston slides with clearance, and/or an exterior wall of the tubular body, formed by an exterior branch of the U-shaped section, has at least one light allowing lubricant to pass through to the outside of the cavity via at least one light, and/or an interior wall of the tubular body, formed by an exterior branch of the U-shaped section, or a wall of an exterior contour of the piston, has at least one ridge forming a channel on said wall and leading to the outside of the U-shape, allowing lubricant to pass to the outside of the cavity
    a circumferential rib on an exterior surface of the tubular body, the rib has the largest exterior diameter of the cap before insertion; a holding space between the rib and the tubular body, or between several ribs, forming a reservoir for the lubricant
    the lubricant is in pasty form
    the lubricant comprises a blend of cetyl alcohol and fats
    the lubricant is covered with a solid envelope designed to self-destruct when the fastener is inserted into the perforation to release the lubricant The object of the invention is also a fastener to assemble at least two structural elements comprising a perforation, with the fastener featuring an enlarged head and a smooth shaft with, before installation, an exterior diameter ($D_1$) larger than an interior diameter ($D_S$) of the perforation or of a sleeve inserted into said perforation.

The fastener features a cap according to the invention, positioned on said fastener at the front, meaning opposite the enlarged head, of one distal end of the smooth shaft.

Thus when the fastener is inserted into the perforation or the sleeve, it is preceded by the cap which distributes the lubricant on the wall of the perforation or the sleeve as the fastener is inserted.

In one embodiment, the distal end of the fastener features a recess, and the cap has a protruding holding element matching said recess. The cap is thus held at the distal end of the fastener without necessarily having wrapping forms of the lockbolt.

In one form, the distal end of the fastener features traction grooves or a threading, and the tubular body of the cap is placed on said grooves or threading. This type of cap can thus be engaged on the distal end of the fastener when a recess in the fastener lockbolt is not desired.

The invention also provides for a process for assembling two structural elements comprising a perforation; the process involves the following steps:
    Assembly of a cap according to the invention on a fastener featuring an enlarged head and a smooth shaft with, before installation, an external diameter ($D_1$) larger than an internal diameter ($D_S$) of the perforation or of a sleeve inserted into the perforation.

Insertion of the fastener and the cap in the perforation or in the sleeve, the cap enters the perforation or sleeve first and lubricates the interior surface of the perforation or the sleeve when its largest external diameter is radially compressed by a wall of the perforation or of the sleeve.

Thus the caps can be placed on the fasteners at any time, for example just before inserting the fastener, to prevent the cap from being damaged for example by loss or all or some of the lubricant.

In one embodiment, the cap is removed after insertion of the fastener, before installing a nut or a collar on the fastener. In this case, if the cap is not physically damaged, it may be reused on another fastener after reconditioning with lubricant.

Figure 9:
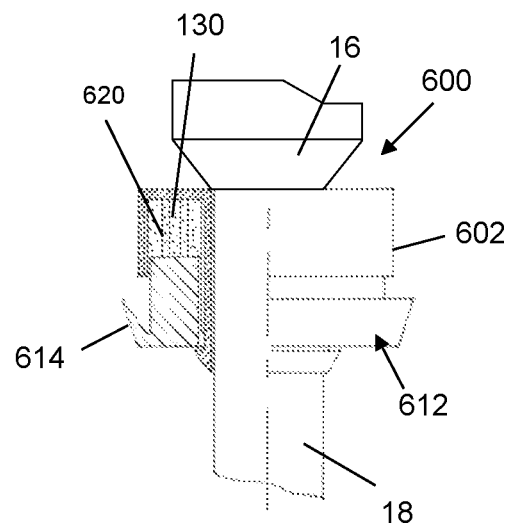
Figure 10:
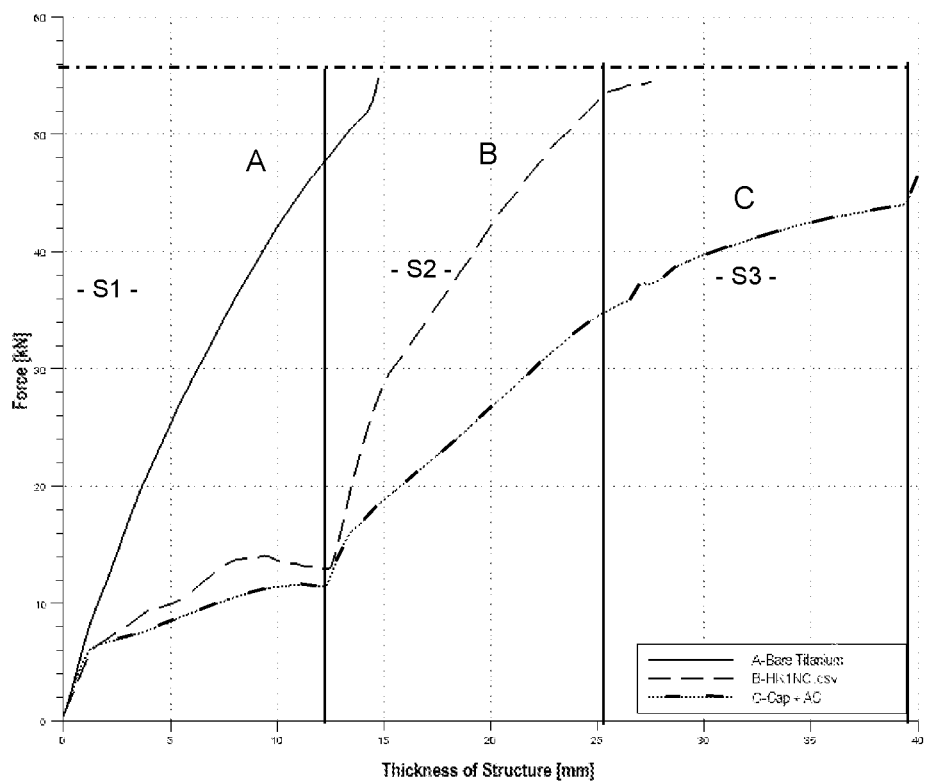

The invention and its various applications will be better understood upon reading the following description and with reference to the accompanying drawings, which are provided solely by way of a non-limiting example of the invention and in which:

FIGS. 1 and 2: already described, a fastener from the prior art respectively before insertion in a structure and during the insertion phase FIG. 3: already described, installation force of a fastener from the prior art in interference in a structure with an assembly of several materials with different properties, previously perforated FIG. 4: a fastener viewed from the side and a cap according to one embodiment of the invention, before installation in a structure FIGS. 5 to 9: caps seen in section and from the side according to various embodiments of the invention, before installation in a structure FIG. 10: curves of measured forces of installation of fasteners from the prior art and a fastener equipped with a cap according to an embodiment of the invention in a multi-layer assembly.

Throughout these figures, identical elements use the same reference numerals. In the following description, the term "distal" means "distant from the fastener head" and the term "proximal" means "close to the fastener head".

In the description, the terms "front" and "rear", unless otherwise indicated, must be understood in terms of the direction in which a fastener is inserted into the perforation in the structure. The rear is thus located near the fastener head and the front in the opposite direction.

In FIGS. 4 to 8, various embodiments of the cap are shown, the right part of the cap is a side view and the left part is a section.

FIG. 4 shows a diagram of an attachment 10 and cap 100 according to a first embodiment of the invention. The fastener comprises a countersunk head 12, a smooth cylindrical shaft 14 with an external diameter $D_1$ and a threaded portion 18 with an external diameter measured at the crest of the thread $D_1$. A transition portion 16 connects the diameter $D_1$ of the smooth cylindrical shaft 14 to the diameter of the threaded portion 18. In its threaded portion the fastener comprises a recess 20 which may be hexagonal, multilobed or threaded. The fastener 10 is intended to be inserted in a perforation of a structure S, with diameter $D_S$ which is, before installing the fastener 10, smaller than the diameter $D_1$ of the smooth shaft 14, and larger than the diameter of the threaded portion.

In the example shown, the fastener 10 is made from titanium alloy, and its external surface is entirely covered with a HI-KOTE™ coating 1 to protect the structure from galvanic corrosion. The fastener could however be bare—for example sandblasted—or may have a thin layer of anodic oxide—for exampled obtained via sulfuric anodization—thus protecting the structure from galvanic corrosion. The fastener could also have annular coating portions, in strips parallel to the axis of the fastener, or in a helical form, as shown in the applicant's patent FR 3 008 754 B1. The fastener could also be entirely covered with cetyl alcohol.

The cap 100 has a tubular body 120 extending longitudinally between a first rear end 122 and a second front end 124. Between these two ends the body has a cylindrical external surface 126. At the front end 124, designed to enter the perforation first, the cap has a first skirt 128, folded so that it faces the external surface of the tubular body 120. The space made between the skirt 128 and the tubular body serves as a reservoir for a lubricant 130.

The cap 100 has a second skirt 132 that forms a second reservoir, and a holding element 134 that protrudes from the rear end 124 matching the recess 20 to allow the cap to be assembled on the fastener 10. In this example, the cap protrudes from the end of the fastener 10.

The free ends of the first and second skirts 128, 132 are flexible and represent the largest external diameter of the cap 100. Their diameters are chosen to be larger than the diameter of the perforation in which the cap is to be inserted.

FIG. 8 shows a diagram of a second embodiment of a cap 200 assembled on the threading of a fastener, when the diameter of the threading is small enough in relation to the perforation to accommodate the thickness of the cap. In this example, the internal surface 202 of the body is smooth and its diameter is adapted to the diameter of the threading, with a slight positive or negative clearance. As a variant that is not shown, the internal surface 202 of the body is threaded to adapt to the threading 18 of the fastener. This variant has the advantage of preventing lubricant from being deposited on the fastener threading, and avoids cleaning of the excess lubricant after inserting the fastener equipped with the cap into the perforation. Of course this cap may also be assembled on the fastener 10 of FIG. 4.

FIG. 6 shows a diagram of a third embodiment of a cap 300 assembled on a fastener's pulling stem, comprising annular traction grooves. The cap 300 is identical to the cap 200, except that in addition it has a polymerized film 304 between the external surface of the body and the skirt, in order to maintain the integrity of the lubricant during transport and storage of the fastener. To form the polymerized film, a polymerizable or cross-linkable liquid composition is applied to the lubricant 130, then it is polymerized and/or air dried.

As a variant, the internal surface 302 of the body may comprise annular grooves (not shown) to adapt to the traction grooves.

FIG. 7 shows a diagram of a fourth embodiment of a cap 400. The cap 400 has a flexible circumferential fin 140 placed on the external surface of the cap body, perpendicular to the axis of the cap. A holding space formed at the second end 424 between the fin 410 and the body of the cap acts as a reservoir for a lubricant. As a variant that is not shown, and similarly to the skirts 128, 132 of the cap 100, the cap 400 may comprise several fins 140 placed parallel to one another, in order to create holding spaces for a lubricant 130. The external diameter of the fins must be larger than the internal diameter of the perforation and the material from which the fins are made must be flexible enough for the fins to fold when the cap is inserted into the structure. This embodiment is particularly easy to produce. It can be used on a threading or on the pulling stem stem of a fastener, like the caps 200 and 300.

FIG. 8 shows a diagram of a fifth embodiment of a cap 500. The cap 500 comprises a tubular body 502 whose internal wall forms a passage for the threaded portion, crimping or traction grooves. The rear end 504 of the body has a U-shaped section in a radial plane. An external wall 506 corresponding to the external branch of the U-shaped section, meaning the U-section farthest from the fastener axis, has lights 508 crossing the thickness of said external wall.

The front end of the tubular body 502 has a circumferential holding lip 510. The cavity between the external wall 506 of the U-section and the body, forming the interior branch of the U-section, forms a reservoir for a lubricant 130.

The cap 500 also has an annular-shaped piston element 512 whose free end at the front of said cap is bent outwards in the form of a flexible skirt 514. The piston element is held between the retaining lip 510 and the external wall 506 of the U-shaped section of the tubular body 502.

The largest diameter of the skirt 514 is larger than the perforation diameter, so that the skirt bends when the fastener is inserted into the perforation. The pressure exerted by the perforation wall on the external surface of the skirt brings the piston element 512 into the reservoir formed inside the U-section of the tubular body 502. The lubricant 130 is then ejected to the outside of the body 502 through the lights 508 and lubricates the internal surface of the perforation.

As a variant of this embodiment, the body does not contain the lights 508 illustrated on FIG. 8. The lubricant 130 is then evacuated via an annular clearance between the tubular body 502 and the piston 512 to allow the piston to slide into the body.

FIG. 9 shows a diagram of a sixth embodiment of a cap 600, whose structure and operation are similar to those of the cap 500 in FIG. 8. In this variant, the body 602 comprises ridges 620 forming channels on the internal wall of the body and leading to the outside of the U-shape.

These channels should preferably extend along the full height of the U-shape and determine a controlled opening section between the reservoir and the outside of the reservoir, regardless of the position of the piston 612 engaged in the body 602. Advantageously, the ridges 620 are distributed on the perimeter of the body to ensure that the lubricant 130 is evenly distributed. The lubricant 130 is then evacuated via the annular clearance between the tubular body 602 and the piston 612 and lubricates the perforation wall.

As a variant of this embodiment, not illustrated, the ridges are formed on the outer outline of the piston 612 to achieve the same result.

The caps 500 and 600, in the examples of embodiments in FIGS. 8 and 9, can be inserted on the locking end of a fastener, for example a threaded portion or a portion featuring crimping grooves, until it comes to a stop against the transition zone 16 separating the smooth shaft 14 from the locking portion 18. The internal diameter of these caps is then adapted to the external diameter of the locking portion, so that they can be assembled to the locking portion with a slight clearance, negative or positive. A slight negative clearance may be desirable when the aim is to maintain the cap on the fastener, in particular when handling the fastener prior to its placement.

The caps 100, 200, 300, 400, 500, 600 are removable and may be reused on another fastener if the material used for the cap is elastic enough to withstand interference installation in the perforations. Once the cap has been removed, after the fastener has been placed, it may be necessary to clean the locking portion 18 or the pulling stem to remove any excess lubricant 130 before installing a nut or a collar to finalize assembly of the structure.

The caps can be made from a lubricating material, comprising a blend of PTFE and another material, such as bronze, graphite or $MoS_2$. Another suitable lubricant to form the cap is a polymer material, comprising solid lubricating particles, such as graphite or cetyl alcohol particles.

The lubricant 130 is for example obtained by mixing raw cetyl alcohol crystals in an oil in such proportions to produce a pasty compound, for example ¾ weight of cetyl alcohol and ¼ weight of oil. The compound is applied hot to the cold cap. In practice, the compound cools in a few seconds, and sets the cetyl alcohol crystals.

As a variant, combined with other embodiments, the lubricant is micro-encapsulated, meaning that particles or small quantities of lubricant are wrapped in capsules designed to break under a given pressure. The capsules are mixed with a binder allowing the lubricant to be placed in the cap's reserve(s).

The largest external diameter of the caps 100, 200, 300, 400, 500, 600 is chosen larger than the smallest diameter of the perforation in which the fastener is installed, so that it is also in interference with the structure. This diameter may be equal to or larger than the diameter of the smooth shaft, so that it remains larger than the diameter of the perforation.

The caps 100, 200, 300, 400 may comprise one or more skirts or fins to define one or more lubricant reservoirs. Thus the cap 100 may comprise only the skirt 128 and the cap 200 or 300 may comprise two skirts like the cap 100, or more than two skirts of the length of the cap permits.

In the written examples, the skirts and the fins are shown in circumferential continuity, identical and parallel to one another. The skirts and fins could extend only on arc segments, be placed in alignment or staggered in relation to one another. The external diameter of each skirt and/or fin may also be identical to the diameters of the other skirts or fins, or may be different.

FIG. 10 shows the results of measurements of the forces of the insertion tests conducted by the applicant, concerning three fasteners inserted into an assembly comprising three adjacent layers each 12.7 mm thick. The first layer S1 is made from aluminum, the second layer S2 from steel and the third layer S3 from aluminum. Each fastener has a shaft diameter of $^{16}/_{32}$" (12.70 mm), withstands maximum traction force of 56 kN and is inserted into a perforation in the structure with interference of 154 µm.

Fastener A is made from bare titanium, non-coated, representing a fastener from the prior art. This fastener barely enters the second layer S2 of the structure and may not be inserted further.

Fastener B is made from coated titanium, fully coated with anti-corrosion HI-KOTE™ 1NC, representing a fastener from the prior art, described in the patent EP 2 406 366 B1. This fastener enters the second layer S2 of the structure but may not be inserted into the third layer of the structure.

Fastener C is made from HI-KOTE™ 1NC coated titanium and equipped with a ring 400 comprising several fins, and a blend of cetyl alcohol and fats between the fins. Fastener C is completely inserted into the structure with an insertion force of around 44 kN.

In this test of fastener C, the cap makes contact with the perforation wall first. Due to the interference, the perforation wall compresses the largest diameter of the cap which expels the lubricant towards the head of the fastener, and the lubricant remains trapped between the shaft and the wall of the fastener. When the fastener moves further into the thickness of the structure, this lubricant helps keep the friction forces between the shaft and the perforation wall below the maximum force permitted for the fastener.

The invention helps to significantly reduce the installation forces in high interference compared with the forces necessary to install fasteners from the prior art.

Reducing the installation forces allows for easier installation by the operators, the use of lighter tools and limits the risks of damaging the structure. Maintaining continuous lubrication during insertion also avoids premature breakage of the fastener when installing it in the structure and the complex removal and installation of a new fastener.

The invention also allows the insertion of fasteners in interference in thicker structures, or with a higher level of interference, or in structures with multiple layers and materials such as titanium or stainless steel, which have the disadvantage of producing high friction forces.

The geometry of the fastener is obviously not limited to that described in the application. A cap may be used on a fastener with for example a protruding head instead of a countersunk head, a conical smooth shaft instead of a cylindrical smooth shaft, and locking grooves instead of threading. The fastener may also comprise a sheath whose internal diameter is smaller than the external diameter of the fastener shaft—whether it is cylindrical or conical—and whose external diameter is smaller than the internal diameter of the perforation before the fastener is installed in the sheath. This type of fastener is for example described in the applicant's patent FR 2 946 707.

In some cases the invention also allows the lubricating or anti-corrosion coating on the shaft and/or the screw and/or inside the sleeve to be removed, for a sheathed fastener. Removing the coating improves electrical conductivity between the screw shaft and the wall of the sleeve or the structure, in particular for lightning currents likely to strike a fastener or a structure of an aircraft.

The invention claimed is:

1. A cap for a fastener wherein when the cap is placed on the fastener, the cap is configured to lubricate an internal wall of a perforation or a sleeve with internal diameter ($D_S$) when part of the fastener passes through at least two structural elements characterized by the fact that the cap comprises a tubular body having an internal wall configured to encircle a portion of a body of the fastener and at least one external wall extending outwardly from the internal wall and where the internal wall and the at least one external wall are configured to form at least one reservoir containing lubricant, wherein before insertion in the perforation or in the sleeve, the cap is configured to have a largest external diameter larger than a smallest internal diameter ($D_S$) of said perforation or sleeve with which the cap is to be used, and by the fact that the lubricant and the cap are configured such that the lubricant of said cap will be distributed over an internal surface of the perforation or the sleeve when said cap is on said fastener and inserted into the perforation or the sleeve and is radially compressed by the internal wall of said perforation or sleeve.

2. The cap according to claim 1 in which the at least one external wall has the largest external diameter of the cap, before insertion into the perforation or the sleeve.

3. The cap according to claim 1 in which the internal wall and the external wall form, within a radial plane of the cap, a U-shaped section; this U-shaped section determines a cavity that forms the reservoir for the lubricant; the cap also features an annular piston feature able to slide with clearance into said cavity, and the piston element has at least one skirt with the largest exterior diameter of the cap before insertion.

4. The cap according to claim 1 in which the internal wall and the external wall form, in a radial plane of said cap, a U-shaped section, which determines a cavity that forms the reservoir for the lubricant, the cap also comprises an annular piston element which is able to slide into said cavity, and the piston element comprises a skirt with the largest external diameter of the cap before insertion, wherein the external wall forming an external branch of the U-section comprises at least one opening allowing said lubricant to pass through to the outside of said cavity via said opening.

5. The cap according to claim 1 in which the internal wall and the external wall form, in a radial plane of said cap, a U-shaped section, which defines a cavity that forms the reservoir for the lubricant, the cap also comprises an annular piston element which is able to slide into said cavity, and the piston element comprises a skirt having the largest external diameter of the cap before insertion, wherein the external wall forming an external branch of the U-section, or a wall of an external surface of the piston, comprises at least a channel allowing said lubricant to pass through to the outside of said cavity via said channel.

6. The cap according to claim 1 comprising at least one circumferential rib on an exterior surface of the external wall, the rib has the largest external diameter of the cap before insertion; a holding space between the rib and the tubular body, or between several ribs, forming the reservoir for the lubricant.

7. The cap according to claim 1, in which the lubricant is in a pasty state.

8. The cap according to claim 7, in which the lubricant comprises a blend of cetyl alcohol and fats.

9. The cap according to claim 7 in which the lubricant is covered with a solid envelope designed to self-destruct when the fastener is inserted into the perforation to release the lubricant.

10. A fastener configured to assemble at least two structural elements comprising a perforation wherein a portion of the fastener can extend into the perforation, the fastener having an enlarged head and a smooth shaft configured with, before installation, an external diameter ($D_1$) larger than an internal diameter ($D_S$) of the perforation or the sleeve inserted into said perforation, characterized by the fact that said fastener comprises a cap according to claim 1, positioned on said fastener opposite the enlarged head of one distal end of the smooth shaft.

11. The fastener according to claim 10 such that the distal end of the fastener has a recess and such that the cap also has a protruding holding element matching said recess.

12. The fastener according to claim 10 such that the distal end of the fastener features traction grooves or a threading, and such that the tubular body of the cap is placed on said grooves or threading.

13. A process for assembling at least two structural elements comprising a perforation; the process involves the following steps:
    assembling a cap according to claim 1 on a fastener featuring an enlarged head and a smooth shaft with, before installation, an external diameter ($D_1$) larger than an internal diameter ($D_S$) of the perforation or of a sleeve inserted into the perforation;
    inserting the fastener and the cap into the perforation or the sleeve, the cap enters the perforation or sleeve first and lubricates the interior surface of the perforation or the sleeve when its largest external diameter is radially compressed by a wall of the perforation or of the sleeve.

14. The assembly process according to claim 13, comprising a subsequent step in which the cap is removed from the fastener, and the fastener is configured relative to the at least two structural elements to include an end portion suitable for receiving a nut or a collar.

\* \* \* \* \*